(12) United States Patent
Horioka et al.

(10) Patent No.: US 7,336,008 B2
(45) Date of Patent: Feb. 26, 2008

(54) WELD JOINING PORTION OF A VEHICLE ALTERNATOR

(75) Inventors: Wasei Horioka, Tokyo (JP); Shin Onose, Tokyo (JP); Shinji Yamazaki, Tokyo (JP); Mitsuaki Izumi, Tokyo (JP); Masami Takano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 10/418,052

(22) Filed: Apr. 18, 2003

(65) Prior Publication Data
US 2003/0197437 A1    Oct. 23, 2003

(30) Foreign Application Priority Data
Apr. 19, 2002 (JP) .............................. 2002-116929

(51) Int. Cl.
*H02K 7/00* (2006.01)
(52) U.S. Cl. ..................................... 310/71; 310/68 D
(58) Field of Classification Search ............. 310/68 D, 310/71, 64, 62; 363/141; 439/874; 29/860; 219/137 R, 121.46, 121.48
See application file for complete search history.

(56) References Cited

U.S. PATENT DOCUMENTS

| | | | | |
|---|---|---|---|---|
| 4,295,029 A | * | 10/1981 | Uba ............................ | 219/75 |
| 4,952,829 A | | 8/1990 | Armbruster et al. | |
| 5,025,554 A | * | 6/1991 | Dohi ........................... | 29/860 |
| 5,296,770 A | | 3/1994 | Pflueger et al. | |
| 5,451,823 A | * | 9/1995 | Deverall et al. .......... | 310/68 D |
| 5,682,070 A | * | 10/1997 | Adachi et al. ................ | 310/71 |
| 5,991,184 A | | 11/1999 | Russell et al. | |
| 6,110,613 A | | 8/2000 | Fuller | |
| 6,160,335 A | * | 12/2000 | Ishida et al. .............. | 310/68 D |
| 6,369,474 B1 | * | 4/2002 | Tanaka et al. ................ | 310/71 |
| 6,429,556 B1 | * | 8/2002 | Nakamura et al. ............ | 310/71 |
| 6,528,912 B2 | * | 3/2003 | Asao ........................ | 310/68 D |
| 6,555,937 B2 | * | 4/2003 | Kurahashi et al. ............ | 310/71 |
| 6,617,723 B1 | * | 9/2003 | Shichijyo ..................... | 310/71 |
| 6,664,675 B2 | * | 12/2003 | Kaizu ....................... | 310/68 D |

(Continued)

FOREIGN PATENT DOCUMENTS

DE         3629864 A1       3/1987

(Continued)

OTHER PUBLICATIONS

Japanese Office Action Dated Nov. 22, 2005 (Three (3) pages).

*Primary Examiner*—Dang Le
(74) *Attorney, Agent, or Firm*—Crowell & Moring LLP

(57) ABSTRACT

The invention concerns with connection of a lead from an electrical component of an alternator for a vehicle, and provides a terminal shape suitable for TIG welding (arc welding using a gas shielded non-consumable electrode) without being affected by dimensional accuracy of terminals to be connected to each other. Cross-shaped projections having a larger volume than a welded region of the terminal is provided near the welded region, and weld penetration (welding depth) is controlled based on a difference in heat capacity resulting from the volume difference, or melting is suppressed with promotion of heat radiation. Thus, the welding depth is stabilized without being affected by dimensional accuracy of the terminals including relative positions between them, and an alternator for a vehicle can be provided in which a lead from an electrical component has high connection reliability.

10 Claims, 6 Drawing Sheets

U.S. PATENT DOCUMENTS

2001/0010436 A1   8/2001   Ballard et al.

FOREIGN PATENT DOCUMENTS

| JP | 62-55878 | | 3/1987 |
|---|---|---|---|
| JP | 05049221 | * | 2/1993 |
| JP | 6-98511 | | 4/1994 |
| JP | 0698511 | * | 4/1994 |
| JP | 06098511 | * | 4/1994 |
| JP | 62-060573 A | | 4/1997 |
| JP | 2000-032720 A | | 1/2000 |
| JP | 2000-197299 A | | 7/2000 |
| JP | 2001-219270 A | | 8/2001 |
| JP | 2001-231209 A | | 8/2001 |

* cited by examiner

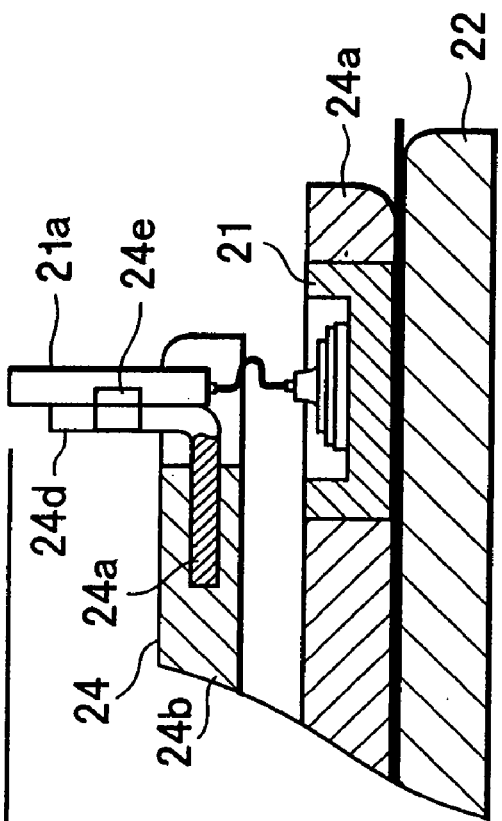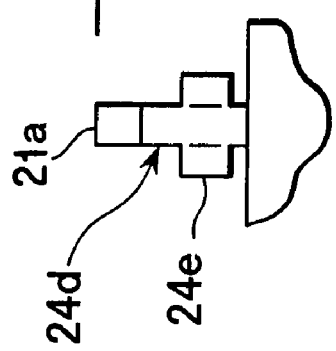
FIG.3B
FIG.3A

WELD JOINING PORTION OF A VEHICLE ALTERNATOR

BACKGROUND OF THE INVENTION

1. Field of the Invention

The present invention relates to an alternator for a vehicle, and more particularly to an improvement of a weldment (weld joined portion) at which a terminal of a semiconductor part (e.g., a diode used as a rectifying device) and an electrical connection terminal of a wiring conductor, for example, are connected to each other by welding.

2. Description of the Related Art

In vehicular alternators (hereinafter referred to simply as "alternators") as disclosed in Japanese Unexamined Patent Application Publication Nos. 6-98511 and 62-55878, for example, resistance welding has been conventionally employed for connection between electrical members of the alternator (e.g., between a connecting member connected to a lead from a stator or a rotor of an alternator and a terminal of a semiconductor device). More specifically, resistance welding is employed to connect copper-made pin-shaped (generally columnar) terminals of plural rectifying devices for rectifying three-phase AC power from the alternator and a steel-made terminal in the form of a flat plate, which is covered with an insulating member around it and which serves as a terminal for connecting the rectifying devices and supplying the rectified power to the vehicle side.

The above-described connection terminal known as the related art generates a larger amount of heat as an output of the alternator increases, and has a problem that the insulating member and the rectifying devices may be damaged by the generated heat. To avoid such a problem, electrical resistance of the terminal for connection among the rectifying devices of the alternator having a large output must be reduced.

Conceivable solutions for reducing the electrical resistance are to increase the size of a terminal shape and to change a material of the connection terminal to a good conductor such as copper. When adopting the solution to change the terminal material from the standpoint of space, however, resistance welding is not suitable for connecting the copper-made terminal of each rectifying device and an electrical connection terminal which is also made of copper, and TIG (tungsten inert gas) welding (i.e., arc welding using a gas shielded non-consumable electrode) must be used.

SUMMARY OF THE INVENTION

It is an object of the present invention to provide a terminal shape and a weld joined structure, which are suitable for connecting copper-made terminals to each other by TIG welding, and to provide an alternator for a vehicle having stable welding quality such as weld strength and weld penetration (welding depth).

According to the present invention, the above object is achieved by the feature that a portion for increasing a volume, e.g., a projection, is provided on a connecting member near its welded region to suppress an increase of the welding depth.

More specifically, the above object is achieved by forming a projection near a position, at which a flat plate-shaped electrical connection terminal and a columnar terminal are joined to each other by welding, so as to project from a lateral surface of said flat plate-shaped electrical connection terminal.

Also, the above object is achieved by providing a molten metal capturing portion provided in a weld joined portion of the electrical connection terminal.

Further, the above object is achieved by providing a pair of heat radiating lugs near a weld joined portion of the electrical connection terminal so as to surround a rectifying device terminal.

Still further, the above object is achieved by providing a thermal mass portion near a weld joined portion of the electrical connection terminal so as to suppress growth of a molten pool produced with welding.

BRIEF DESCRIPTION OF THE DRAWINGS

FIG. 3 is a sectional view taken along the line A-A in FIG. 2;

DESCRIPTION OF THE PREFERRED EMBODIMENTS

Figure 1:
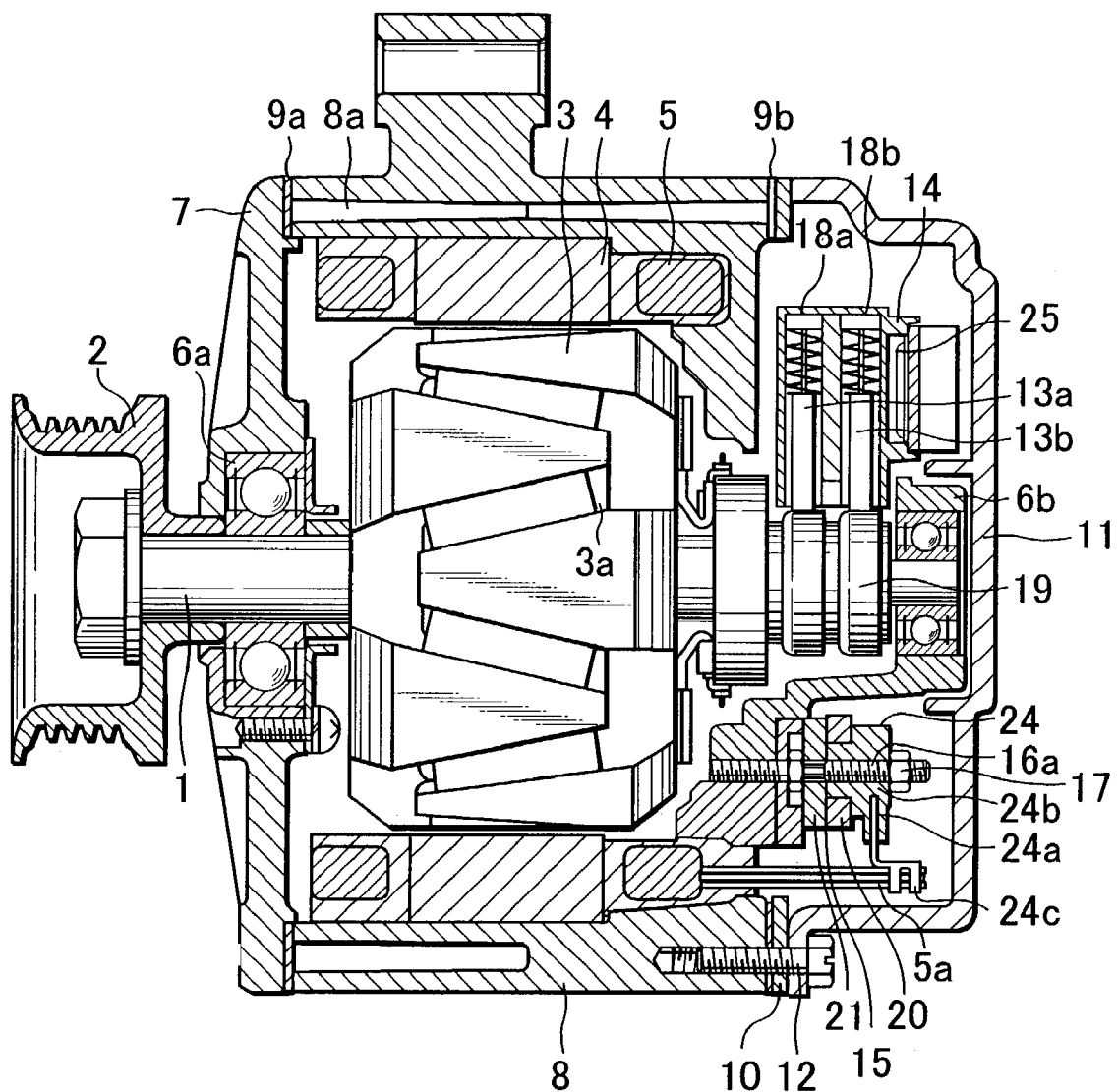
FIG. 1 is a vertical sectional view showing one embodiment of an alternator for a vehicle in which the present invention is implemented.
Figure 2:
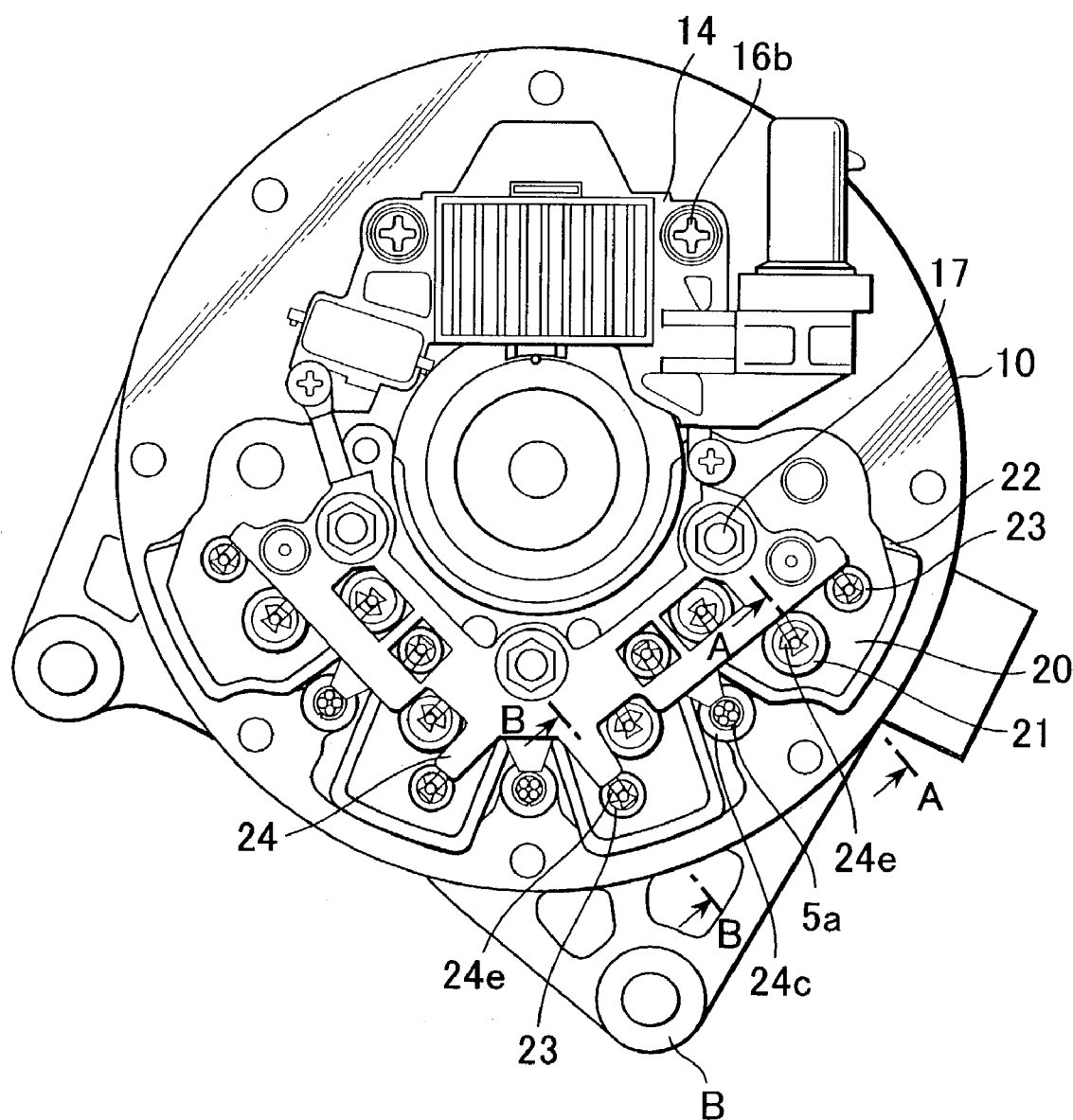
FIG. 2 is a right side view of the alternator of FIG. 1 in a state in which a rear cover is removed.

One embodiment of the present invention will be described below in more detail with reference to FIGS. 1, 2, 3 and 4.

A pulley 2 for transmitting a driving force from an engine (not shown) to a rotor shaft 1 is disposed at an end of the rotor shaft 1, and a rotor 3 having claw-shaped magnetic poles, over which field coils 3a are wound, generates a revolving magnetic field with rotation of the pulley 2. The revolving magnetic field induces an electromotive force in three-phase stator coils 5 wound over respective cores of a stator 4, which is disposed around the rotor 3 with a gap left between them. The rotor shaft 1 is rotatably supported by bearings 6a, 6b, and the bearings 6a, 6b are in turn supported by brackets 7, 8, respectively. The cores of the stator 4 are supported by the bracket 8. The bracket 8 is provided with a water passage 8a through which cooling water is circulated to cool heat generating parts such as the stator coils 5. Gaskets 9a, 9b for sealing off the water passage 8a are disposed respectively at opposite ends of the water passage 8a. The gasket 9b is fixed together with a plate member 10 and a rear cover 11 in a sandwiched relation to the bracket 8 using bolts 12. A brush holder 14 for accommodating brushes 13a, 13b to supply field currents to the field coils 3a and a rectifier 15 for rectifying three-phase AC power generated in the stator coils 5 are both fixed to the plate member 10 using bolts 16a, 16b and nuts 17. The brushes 13a, 13b supply the field currents to the field coils 3a of the rotor 3 while being held in slide contact with respective current collecting rings 19 by pressing forces of springs 18a, 18b both accommodated in the brush holder 14. The field currents are regulated by a voltage regulator 25 accommodated in a part of the brush holder 14, and the voltage of the field currents is adjusted to a prescribed value. The rectifier 15 comprises a minus-side diode 23 fixed to a heat radiating plate 22, a plus-side diode 21 fixed to a heat radiating plate 20, and a connecting member 24 for connecting respective terminals 21a, 23a of the plus-side diode 21 and the minus-side diode 23 to each other. The connecting member 24 comprises a terminal member 24a and an insulating member 24b in which the terminal members 24a are partly embedded. The three-phase stator coils 5 are interconnected in the form of Δ- or Y-connection, and three or four leads 5a from the stator coils 5 are each connected to a terminal portion 24c as a part of the terminal member 24a of the connecting member 24 of the rectifier 15. The terminal 21a, 23a of the plus-side diode 21 or the minus-side diode 23 of the rectifier 15 is connected to another terminal portion 24d of the terminal member 24a, which is positioned oppositely away from the terminal portion 24c, and an AC current flows through the terminal member 24a. Because the terminal member 24a generates heat upon the current flowing through it, a material having small electrical resistance, e.g., copper, is selected as the terminal member 24a of an alternator for a large power. Also, because the terminal portion 24c of the terminal member 24a and the terminals 21a, 23a of the plus-side diode 21 and the minus-side diode 23 are both made of copper, resistance welding has a difficulty in connecting them to each other, and TIG welding is used for connection therebetween. The use of TIG welding requires dimensional accuracy of each terminal and a welding electrode, and a variation occurs in weld penetration (welding depth) depending on the dimensional accuracy. The terminal portion 24d of the terminal member 24a is not uniform in shape and is provided with projected lugs 24e in its intermediate position that is determined in consideration of the welding depth of from the terminal end. The projected lugs 24e have a different heat capacity from the other part of the terminal portion 24d. Accordingly, the projected lugs 24e limit the weld penetration, and even if there are large variations in distance between the welding electrode and each terminal and in dimensions of each terminal, the weld penetration is stopped at the position of the projected lugs 24e and the welding depth is stabilized.

With this embodiment, since the weld penetration is stably set without being affected by the dimensional accuracy of the terminals, welding can be performed with stability in quality such as welding strength, and severe dimensional management is no longer required. As a result, an alternator can be provided which is relatively inexpensive and easy to manufacture.

Another advantage is in that, by bending the projected lugs 24e of the terminal portion 24d of the terminal member 24a toward the side of the terminal 21a, 23a of the plus-side diode 21 or the minus-side diode 23, it is possible to easily position the terminal portion 24d of the terminal member 24a relative to the terminal 21a, 23a of the plus-side diode 21 or the minus-side diode 23.

Figure 5:
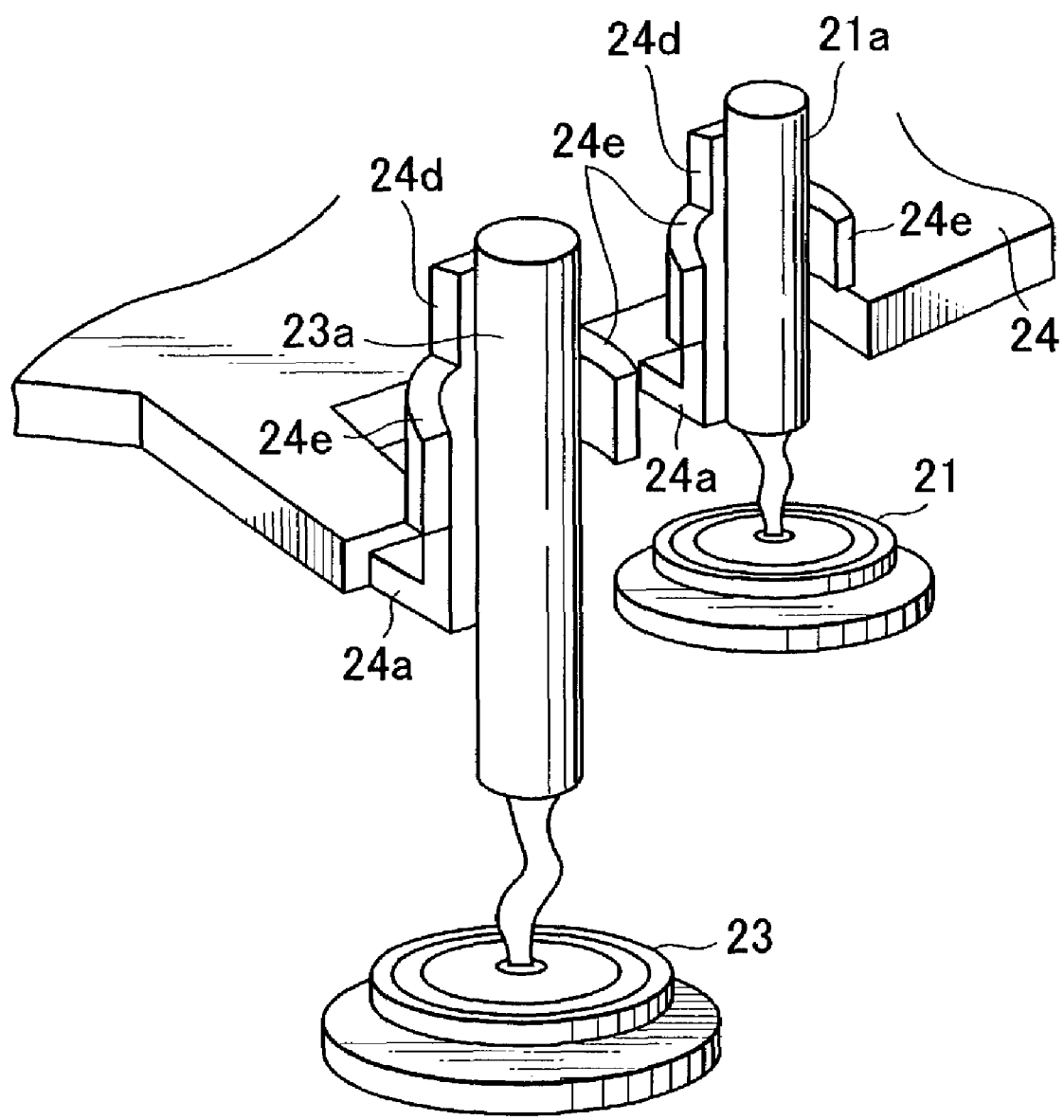
FIG. 5 is a schematic view of a weld joined portion.
Figure 6:
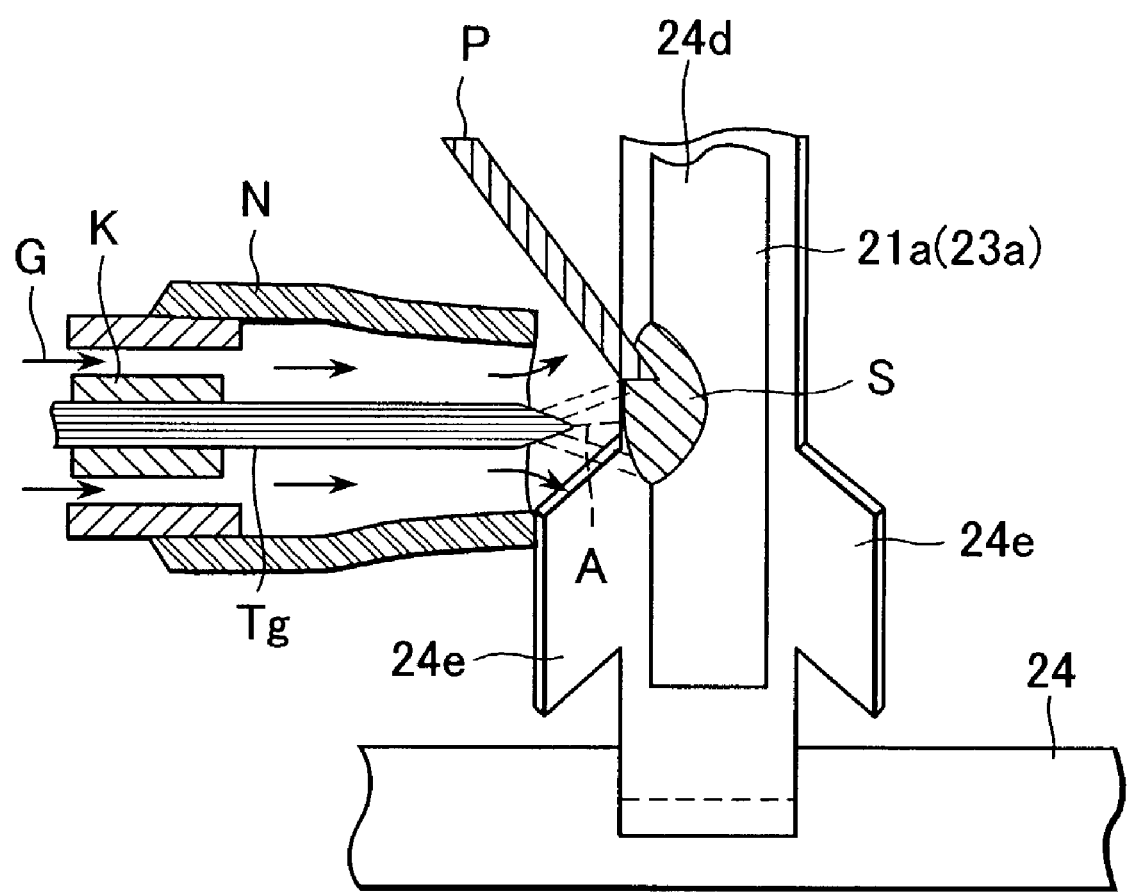
FIG. 6 is a schematic partial sectional view showing a state under welding.

With reference to FIGS. 5 and 6, a description is made in detail of how the terminal 21a of the plus-side diode 21 fixed to the heat radiating plate 20 and the terminal 23a of the minus-side diode 23 fixed to the heat radiating plate 22 are welded to the electrical connection terminal members 24a to 24e by arc welding using a gas shielded non-consumable electrode. Note that, in FIGS. 5 and 6, principal parts are illustrated in exaggerated fashion with dimensions somewhat different from actual ones.

Figure 4A:
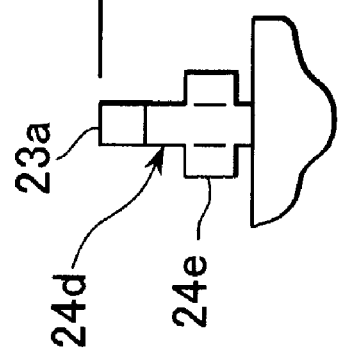
FIG. 4 is a sectional view taken along the line B-B in FIG. 2.
Figure 4B:
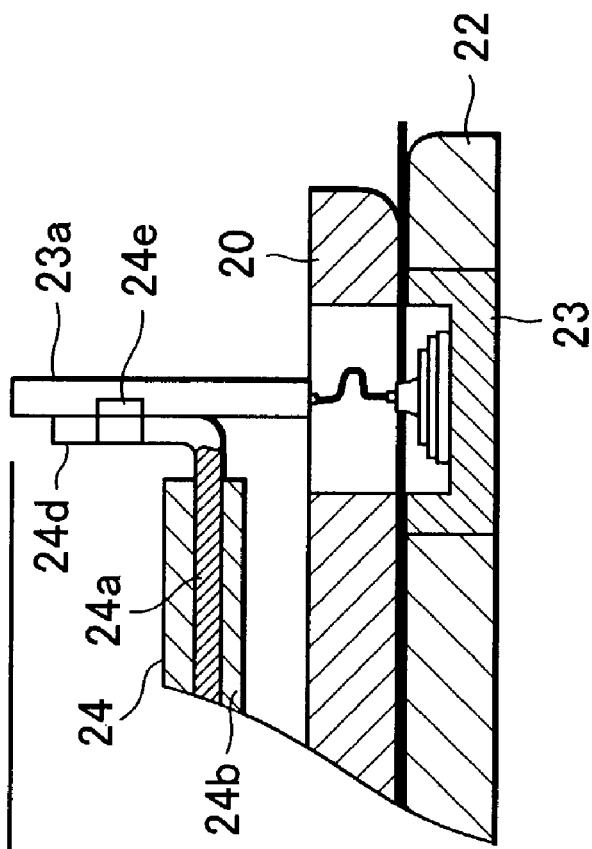

As shown in FIGS. 3 and 4, the heat radiating plates 20, 22, to which the plus-side diode 21 and the minus-side diode 23 are fixed respectively, are disposed in two steps one above the other in the height direction. Therefore, the distances from the positions, at which the plus-side diode 21 and the minus-side diode 23 are mounted, to respective welding positions differ from each other depending on which one of the plus-side diode 21 and the minus-side diode 23 is subjected to the welding.

In this embodiment, the connecting member 24 comprises the insulating member 24b made of an insulating resin, and an electrical connection conductor made of copper or a copper alloy and partly molded (embedded) in the insulating member 24b. The terminal member 24a is a part of the electrical connection conductor.

The terminal member 24a is projected out of an edge of an insulating plate constituting the insulating member 24b, and a part of the terminal member 24a, which is bent at 90 degrees relative to the insulating plate of the insulating member 24b and extended from it, serves as the terminal portion 24d. The terminal portion 24d is extended in a juxtaposed relation to each of the terminals 21a, 23a of the plus-side diode 21 and the minus-side diode 23.

The terminals 21a, 23a of the plus-side diode 21 and the minus-side diode 23 have lengths set different from each other such that terminal upper ends are located in positions at the same level.

A pair of left and right projected lugs (projections) 24e projecting from each terminal portion 24d in the cross form are formed midway each of the terminal portions 24d at the same level.

The terminals 21a, 23a of the plus-side diode 21 and the minus-side diode 23 are arranged adjacent to the respective terminal portions 24d. Preferably, the terminals 21a, 23a and the terminal portions 24d are held in a closely contact state.

In that condition, the projected lugs 24e are slightly bent toward the terminal 21a or 23a so as to surround it. The amount by which the projected lugs 24e are bent is set to be the same regardless of the terminal type, and is adjusted to a value that has been determined based on experiments beforehand for each model in consideration of the effect of the projected lugs 24e limiting the metal penetration (welding depth of the metal) during the welding.

A gas nozzle N of a welding device is moved toward a preset position between the projected lugs 24e and a distal end of the terminal portion 24d, and generates an arc A between a distal end of a tungsten electrode Tg and the terminal portions 24d.

An inert gas G is ejected from the surroundings of a collet K, and the arc welding is performed in the inert gas G. A welding rod P is automatically inserted into the arc A by the welding device.

When the tungsten electrode Tg is set to a plus electrode, the weld penetration in a weldment is small, but a superior cleaning action is obtained in the welding position.

On the other hand, when the tungsten electrode Tg is set to a minus electrode, the weld penetration in a weldment is increased. In this embodiment, the welding is performed in the latter setting.

When the arc A occurs, the terminal portions 24d as a base material and the terminal 21a or 23a as a welding metal are molten, whereupon a molten pool S is produced. In the molten pool S, three kinds of metals including the metal of the welding rod fused together, and a metal joined layer is formed after cooling.

Since the distance and angle of the tungsten electrode Tg relative to a welded region differ, though just a small, depending on each of welded regions, the extent of growth of the molten pool S also differs correspondingly. The welding time is set such that a weld joined portion is surely formed even under the worst welding conditions. In a place where better welding conditions are satisfied, therefore, the molten pool S grows faster and spreads over a larger area. The inventors have discovered that, if there occurs a variation in growth of the molten pool, the resistance value is affected when looking at the weld joined portion as an electrical conductor.

Then, the inventors have made endeavors to find a solution for keeping the growth of the molten pool as even as possible. The principle of the effective solution resides in that a heat radiating portion having a large thermal mass is disposed near the weld joined portion in the direction of growth of the molten pool, whereby when the molten pool reaches the position of the heat radiating portion, further growth of the molten pool is prevented.

Based on that principle, even when a relatively long welding time is required depending on the welded region, the growth of the molten pool is surely stopped at the position of the heat radiating portion, and an area over which the weld joined metal portion spreads becomes more uniform than in the related art. As a result, the weld joined portion can be formed with even electrical resistance.

This implies that currents flowing in armatures and rotors can be made even in individual alternators, and hence alternators having smaller variations in performance and higher quality can be mass-produced.

In short, basic constructions of the preferred embodiment and examples of the present invention are as follows:

a. An alternator for a vehicle includes a stator 4, a rotor 3 rotatably disposed inside the stator 4 with a predetermined gap therebetween, and a semiconductor device (plus-side diode 21 or minus-side diode 23) electrically connected through a connecting member 24 to at least a lead 5a from each of the stator 4 and the rotor 3. A portion of the connecting member 24 welded to the lead (lead 5a from a stator coil 5) has a smaller volume than the other portions of the connecting member 24 and the lead (lead 5a from the stator coil 5).

b. A material of an electrically conductive portion of the connecting member 24 (terminal portion 24a of the connecting member 24) is copper or a copper alloy.

c. An alternator for a vehicle includes an insulating plate (connecting member 24) mounted to an alternator body; a flat plate-shaped electrical connection terminal (terminal member 24a) projecting from an edge of the insulating plate; and a rectifying device (plus-side diode 21 or minus-side diode 23) having a columnar terminal (terminal 21a or 23a) extended in a juxtaposed relation to the electrical connection terminal (terminal member 24a), the flat plate-shaped electrical connection terminal (terminal member 24a) and the columnar terminal (terminal 21a or 23a) being joined to each other by welding (TIG welding). The flat plate-shaped electrical connection terminal (terminal member 24a) has a projection (projected lug 24e) formed near (under) a position, at which the flat plate-shaped electrical connection terminal and the columnar terminal are joined to each other by welding, so as to project from a lateral surface of the flat plate-shaped electrical connection terminal (terminal member 24a).

d. The projection (projected lug 24e) includes a pair of projections extending in directions opposed to each other, and the flat plate-shaped electrical connection terminal (terminal portion 24a) and the projection (projected lug 24e) intersect in a cross form.

e. The flat plate-shaped electrical connection terminal (terminal portion 24a) and the columnar terminal (terminal 21a or 23a) of the rectifying device (plus-side diode 21 or minus-side diode 23) are made of copper or a copper alloy having electrical conductivity.

f. The flat plate-shaped electrical connection terminal (terminal portion 24a) and the columnar terminal (terminal 21a or 23a) of the rectifying device (plus-side diode 21 or minus-side diode 23) are welded to each other by arc welding using a gas shielded non-consumable electrode.

g. An alternator for a vehicle includes an electrical connection terminal (terminal portion 24a) made of copper or a copper alloy; and a molten metal capturing portion (projected lug 24e) provided near a weld joined portion (molten pool S) of the electrical connection terminal to a terminal (terminal 21a or 23a) of a rectifying device (plus-side diode 21 or minus-side diode 23), which is made of copper or a copper alloy.

h. An alternator for a vehicle includes an electrical connection terminal (terminal member 24a) made of copper or a copper alloy; and a pair of heat radiating lugs (projected lugs 24e) provided near a weld joined portion (molten pool S) of the electrical connection terminal (terminal member 24a) to a terminal (terminal 21a or 23a) of a rectifying device (plus-side diode 21 or minus-side diode 23), which is made of copper or a copper alloy, the pair of heat radiating lugs surrounding the terminal (terminal 21a or 23a) of the rectifying device (plus-side diode 21 or minus-side diode 23).

i. An alternator for a vehicle includes an electrical connection terminal (terminal member 24a) made of copper or a copper alloy; and a thermal mass portion (projected lug 24e) provided near a weld joined portion (molten pool S) of the electrical connection terminal to a terminal (terminal 21a or 23a) of a rectifying device (plus-side diode 21 or minus-side diode 23), which is made of copper or a copper alloy, the thermal mass portion suppressing growth of the molten pool S produced with welding.

According to the present invention, as described above, quality of the weld joined portion in an alternator for a vehicle is ensured. For example, welding quality such as weld strength and weld penetration is stabilized. As a result, quality of individual alternators is stabilized. For example, a variation in electrical resistance value of the weld joined portion is reduced.

What is claimed is:

1. A connected structure of a terminal in which an electrical connecting terminal and a terminal opposed to said electrical connecting terminal have a weld portion for connecting the terminals, the weld portion being produced by arc welding using a gas shielded non-consumable electrode,
   wherein a weld-limiting portion of said structure has a different heat mass than another portion of said structure, and said weld-limiting portion is provided contiguous the weld portion which is smaller in size than said weld-limiting portion.

2. A connected structure of a terminal in which an electrical connecting terminal and a terminal opposed to said electrical connecting terminal have a weld portion for connecting the terminals, the weld portion being produced by arc welding using a gas shielded non-consumable electrode,
   wherein an exposed volume-enlarged portion of said structure has a larger volume than another portion of said structure and is provided contiguous the weld portion.

3. A connected structure of a terminal in which an electrical connecting terminal and a terminal opposed to said electrical connecting terminal have a weld portion for connecting the terminals, the weld portion being produced by arc welding using a gas shielded non-consumable electrode,
   wherein an exposed heat-limiting projecting portion of said structure which projects from a lateral surface of another portion of said structure is provided contiguous the weld portion of a size smaller than said projecting portion.

4. A connected structure of a terminal according to claim 3, wherein said projection comprises a pair of projections extending in opposite directions, and
said electrical connecting terminal has a flat plate-shape and intersects said projection in a cross form.

5. A connected structure of a terminal according to claim 3, wherein said projecting portion is bent toward said terminal.

6. A connected structure of a terminal in which a flat plate-shaped connecting terminal and a terminal opposed to said electrical connecting terminal have a weld portion for connecting the terminals, the weld portion being produced with the formation of a molten pool by arc welding using a gas shielded non-consumable electrode,
wherein a heat radiation portion of said connected structure has a larger heat mass than another portion of said connected structure and is configured to be adjacent the molten pool of smaller size than said heat radiation portion to as well as an area constituting a growth direction of the molten pool.

7. An alternator for a vehicle, comprising:
a rotating shaft transmitting a driving force from an internal combustion engine;
a rotor arranged at said rotating shaft and generating a rotating magnetic field by claw-shaped magnetic poses over which field coils are wound;
a stator arranged at an outer side of said rotor with a gap and generating electromotive force at a wound stator coil;
a rectifier for rectifying alternate electric power generated by said stator coil;
an electrical connecting terminal connecting said stator coil;
a terminal of said rectifier and said electrical connecting terminal have a connection instituted by a weld portion, the weld portion being produced by arc welding using a gas shielded non-consumable electrode; and
a weld-limiting portion provided adjacent the weld portion which is of smaller size than said heat-limiting portion and having a heat mass different than a heat mass of another portion of a structure formed by said weld-portion-connected electrical connecting terminal and said terminal of said rectifier.

8. An alternator for a vehicle, comprising:
a rotating shaft transmitting a driving force from an internal combustion engine;
a rotor arranged at said rotating shaft and generating a rotating magnetic field by claw-shaped magnetic poses over which field coils are wound;
a stator arranged at an outer side of said rotor with a gap and generating electromotive force at a wound stator coil;
a rectifier for rectifying alternate electric power generated by said stator coil;
an electrical connecting terminal connecting said stator coil;
a terminal of said rectifier and said electrical connecting terminal have a connection instituted by a weld portion, the weld portion being produced by arc welding using a gas shielded non-consumable electrode; and
an exposed enlarged portion provided adjacent the weld portion by and having a larger volume than another portion of a structure formed by said weld-portion-connected electrical connecting terminal and said terminal of said rectifier so as to be heat limiting.

9. An alternator for a vehicle, comprising:
a rotating shaft transmitting a driving force from an internal combustion engine;
a rotor arranged at said rotating shaft and generating a rotating magnetic field by claw-shaped magnetic poses over which field coils are wound;
a stator arranged at an outer side of said rotor with a gap and generating electromotive force at a wound stator coil;
a rectifier for rectifying alternate electric power generated by said stator coil;
an electrical connecting terminal connecting said stator coil;
a terminal of said rectifier and said electrical connecting terminal has a connection constituted by a weld portion, the weld portion being produced by arc welding using a gas shielded non-consumable electrode; and
an exposed heat-limiting projecting portion provided adjacent the weld portion and projecting from a lateral surface of another portion of a structure formed by said weld-portion-connected electrical connecting terminal and said terminal of said rectifier.

10. An alternator for a vehicle, comprising:
a rotating shaft transmitting a driving force from an internal combustion engine;
a rotor arranged at said rotating shaft and generating a rotating magnetic field by claw-shaped magnetic poses over which field coils are wound;
a stator arranged at an outer side of said rotor with a gap and generating electromotive force at a wound stator coil;
a rectifier for rectifying alternate electric power generated by said stator coil;
an electrical connecting terminal connecting said stator coil;
a terminal of said rectifier and said electrical connecting terminal has a connection constituted by a weld portion, the weld portion being produced by arc welding using a gas shielded non-consumable electrode with the formation of molten pool; and
an exposed heat radiation portion configured to be adjacent an area of the molten pool as well as an area adjacent to a growth direction of the molten pool, and wherein said heat radiation portion has a larger heat mass than another portion of a structure formed by said weld-portion-connected electrical connecting terminal and said terminal of said rectifier.

* * * * *